Dec. 20, 1932.  H. PFANNENSTIEHL  1,891,241

SOUND PICTURE SYSTEM

Filed Oct. 31, 1930

INVENTOR
H. PFANNENSTIEHL
BY
M. B. McKenney
ATTORNEY

Patented Dec. 20, 1932

1,891,241

UNITED STATES PATENT OFFICE

HARRY PFANNENSTIEHL, OF MOUNTAIN LAKES, NEW JERSEY, ASSIGNOR TO BELL TELEPHONE LABORATORIES, INCORPORATED, OF NEW YORK, N. Y., A CORPORATION OF NEW YORK

SOUND PICTURE SYSTEM

Application filed October 31, 1930. Serial No. 492,383.

This invention relates to sound-picture systems and more particularly to film drive mechanisms employed in such systems.

The objects are to safeguard the film against scratching or other damage as it is moved by the drive mechanism past the exposure or translation point, to prevent the film from warping or buckling during its movement under the control of the drive mechanism, and to otherwise improve apparatus of this character.

It is the usual practice in film drive mechanisms to feed the film over an aperture plate at the translation point and in addition to provide resilient means in the form of a film gate or presser feet to hold the film flat as it passes the exposure point. It has been found, particularly in connection with sound film, that great damage is done to the film due to its rubbing against the aperture plate and presser feet. This disadvantage has been partly eliminated by discarding the presser feet and providing a stationary curved aperture plate, over which the film is passed with the non-emulsion side of the film contacting with the aperture plate. However, this method does not completely eliminate the possibility of damage as the non-emulsion side of the film contacts with the fixed aperture plate, causing friction and damage to the film.

In accordance with this invention, a film drive mechanism is provided in which the possibility of damage to the film caused by its rubbing against stationary surfaces is entirely eliminated. More specifically, there is provided a film drive mechanism in which the film is guided through the projecting light beam over two freely rotatable disc members adapted to contact edgewise with the marginal edges of the film and to be rotated in response to the movement of the film. The film is kept in close contact with the rotatable disc members by means of tension rollers located above the exposure point. As the film is moved by some suitable driving means, the disc members will guide the film accurately longitudinally through the focal point of the light beam. Moreover, since the discs rotate in response to the movement of the film, there can be no possibility of damage to the film caused by its rubbing against stationary surfaces. By reason of the film assuming a curved position at the exposure point, the possibility of warping or buckling of the film is entirely eliminated.

Figure 1:
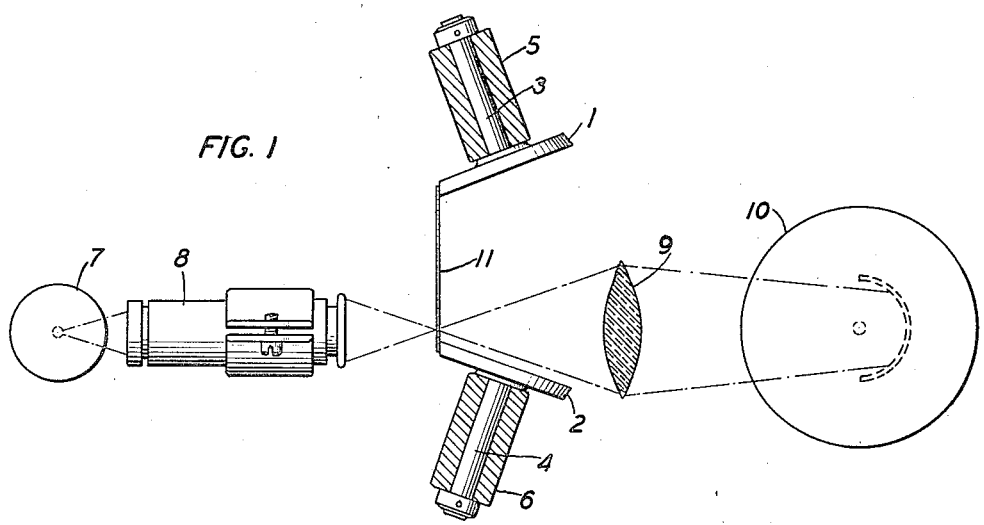

In the drawing, Fig. 1 is a top view showing the optical system of a sound-film reproducer together with the film guide mechanism.

Figure 2:
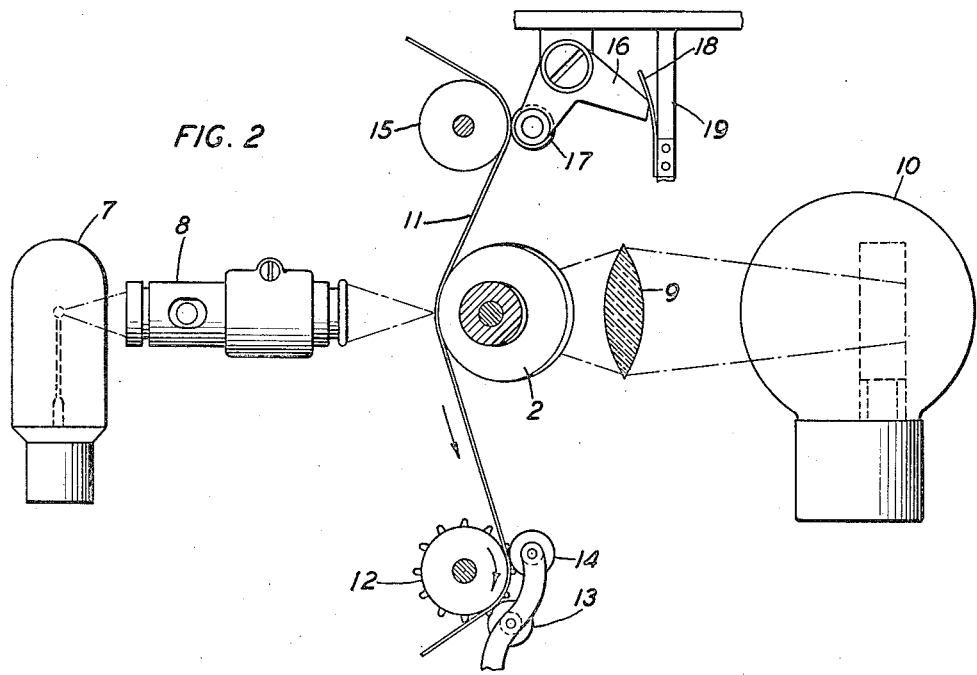

Fig. 2 is a side view of this apparatus showing, in addition, the film drive sprocket and the tension control mechanism.

The film guide mechanism, which serves to guide and hold the film in proper position as it passes through the light beam of the optical system, comprises a pair of discs or rollers 1 and 2. These rollers have bevelled surfaces and are set at the proper angle to engage the edges of the film 11. The bevelled rollers 1 and 2 are provided with shafts 3 and 4 respectively, which are journalled to rotate freely in the stationary bearings 5 and 6 respectively.

The optical system comprises a source of light in the form of a lamp 7, a focusing lens system 8, a condensing lens 9, and a photoelectric cell 10. The lens 8 is adjustable so as to bring the focal point of the light beam at or near the surface of the film 11. Inasmuch as the sound track is usually recorded at one edge of the film, the optical system is so positioned with respect to the other parts of the reproducer that the beam of light is directed toward that edge of the film in which the sound is recorded. This is more clearly seen in Fig. 1. Since the focal point of the light beam is in the vicinity of the film 11, the rays diverge after passing through the film and are collected by the condensing lens 9 and directed to the photoelectric cell 10. By setting the guide roller 2 at an angle as shown in Fig. 1, it is possible to secure a compact structure and at the same time avoid interference with the rays of light after passing through the film 11.

The film is drawn downward through the light beam by means of a driving sprocket 12 actuated by some suitable source of power and is maintained at a uniform degree of tautness by the drag rollers 15 and 17. The latter of these rollers is mounted on one arm of the bell-crank lever 16, the other arm of which engages a spring 18 which urges the roller 17 against the film 11. The film 11 is maintained in continuous engagement with the driving sprocket 12 by means of the idler rollers 13 and 14.

By a proper location of the rollers 1 and 2 with respect to the roller 15 and sprocket 12, the film is forced to pass through a curved path on its way through the light beam. This insures a constant pressure of the film against the rollers 1 and 2 sufficient to cause these rollers to rotate and also sufficient to guard against any deviation of the film's course through the light beam.

With this device the film is relieved of practically all rubbing engagement with the parts of the guide mechanism. Moreover, the actual contact between the film and the rollers 1 and 2 may be reduced to a minimum, thus obviating scratching and other damage to the film. Since it is unnecessary to provide presser feet or other similar devices for holding the film against the guide rollers 1 and 2, the likelihood of buckling and warping of the film is also eliminated.

The invention has been illustrated in connection with a sound-picture reproducer, in which case the photoelectric cell 10 sets up varying currents which are amplified and applied to loudspeaking receivers. It will be understood that the invention is not strictly limited to the use illustrated but may be employed in connection with a variety of photo-optical systems.

What is claimed is:

1. The combination in a sound picture system of means for producing a beam of light, a lens for focusing said beam of light, a film, means for driving said film through said beam of light substantially at the focal point, a pair of rollers disposed obliquely with respect to said film and engaging the marginal edges thereof on either side of the light beam and rotatable in response to the movement of said film for the purpose of guiding and maintaining said film in its proper location with respect to said focal point, a photoelectric cell, and a lens for collecting the light passing through said film and for directing it to said cell.

2. The combination in an optical system of means for producing a beam of light, a film, means for moving said film through said beam of light, a pair of obliquely disposed rollers engaging the edges of said film and rotatable in response to the movement thereof for the purpose of maintaining said film in proper relation to said beam of light, and means for maintaining said film against the surfaces of said rollers with a uniform degree of pressure.

3. The combination in a sound picture system of means for producing a beam of light, a film, a lens for focusing said beam of light near one edge of the film, means at one side of the beam of light for driving said film through the beam of light substantially at the focal point, means at the opposite side of the beam of light for holding the film taut while it is being driven through the beam of light, a pair of rollers disposed obliquely with respect to said film and engaging the marginal edges thereof on either side of the light beam on one side of the film only with one roller located near the focal point of the light beam and rotatable in response to the movement of said film for the purpose of guiding and maintaining said film in its proper location with respect to said focal point, a photoelectric cell, and a lens for collecting the light passing through said film and for directing it to said cell.

4. The combination in an optical system of means for producing a beam of light, a film, means for moving said film through said beam of light, a pair of rollers each having a cone shaped surface, obliquely disposed in relation to the surface of the film, said cone shaped surfaces engaging the edges of said film and said rollers being rotatable in response to the movement of the film for the purpose of maintaining said film in proper relation to said beam of light, and means for maintaining said film against the cone shaped surfaces of said rollers with a uniform degree of pressure.

5. The combination in an optical system of means for producing a beam of light, a film, means for moving said film through said beam of light, a pair of obliquely disposed rollers engaging the edges of said film on one side thereof only and so located as not to interfere with the light beam as it passes through the film and spreads out on its way beyond the film, said rollers being rotatable in response to the movement of the film for the purpose of maintaining said film in proper relation to said beam of light, and means at one side of these rollers for maintaining said film against the surfaces of said rollers with a uniform degree of pressure.

6. The combination in an optical system of means for producing a beam of light, a film, means for moving said film through said beam of light substantially at the focal point thereof, a pair of obliquely disposed rollers engaging the edges of said film and rotatable in response to the movement thereof for the purpose of maintaining said film in proper relation to said beam of light, said rollers being so located at the edges of the film and at such an oblique angle away from the film as not to interfere with the light beam after it has passed through the film and spreads out on its way beyond the film, and means for maintaining said film against the surfaces of said rollers with a uniform degree of pressure.

7. The combination in an optical system of means for producing a beam of light, a film, means for moving said film through said beam of light, a pair of obliquely disposed rollers engaging the edges of said film on one side thereof only and rotatable in response to the movement thereof, said rollers being so located in relation to the means for moving the film that they guide the film through a curved path on its way through the light beam.

In witness whereof, I hereunto subscribe my name this 27th day of October, 1930.

HARRY PFANNENSTIEHL.